Oct. 13, 1964   F. E. EDE ETAL   3,152,657
STEERING CONTROL ARRANGEMENT
Filed Feb. 20, 1961   4 Sheets-Sheet 3

INVENTORS
FRANK ERNEST EDE
AND HAROLD FRANK DEAN
By Linton and Linton
ATTORNEYS

Oct. 13, 1964  F. E. EDE ETAL  3,152,657
STEERING CONTROL ARRANGEMENT
Filed Feb. 20, 1961  4 Sheets-Sheet 4

INVENTORS
FRANK ERNEST EDE
AND HAROLD FRANK DEAN
By Linton and Linton
ATTORNEYS

United States Patent Office 3,152,657
Patented Oct. 13, 1964

3,152,657
STEERING CONTROL ARRANGEMENT
Frank Ernest Ede, Bagshot, England (Angley Parkway, Camberley, England), and Harold Frank Dean, Camberley, England (14 Septon Close, West End, Woking, England)
Filed Feb. 20, 1961, Ser. No. 90,450
Claims priority, application Great Britain Feb. 26, 1960
3 Claims. (Cl. 180—77)

The present invention relates to a vehicle steering shaft for enabling a vehicle such as a heavy duty tractor to be directly steered by means of a single pair of steering road wheels being either at the front or at the back of the vehicle as it is driven. Such vehicles have an upright centrally located steering shaft and two seats, facing in diametrically opposite directions with respect to the steering shaft or a single seat which is rotatable about the steering shaft. Thus by "directly steered" is intended the normal action of a vehicle driver facing forward in the direction of driving as the vehicle is driven: a pull with the right hand on the driving steering hand wheel makes the vehicle turn to the right and a pull with the left hand makes it turn to the left.

It is an object of the present invention to provide a vehicle steering shaft which facilitates the open road driving of a vehicle such as a heavy duty tractor which is normally steered through its rear wheels by enabling it to be also steered by means of the steering road wheels which are forward at a given time.

It is a further object of the present invention to provide a vehicle steering shaft of simple design and sturdy construction for enabling the direction of steering the vehicle to be simply altered.

It is yet another object of the present invention to enable the direction in which the vehicle is to be steered to be readily determined by the orientation of the vehicle instrument panel.

It is yet another object of the present invention to provide a safety device for insuring that the engine can not run when the driving steering hand wheel is not in operative engagement with the steering box and hence with the steering road wheels.

The following is a description by way of example of an embodiment of the present invention. Reference is made to the accompanying drawings in which.

Figure 1:
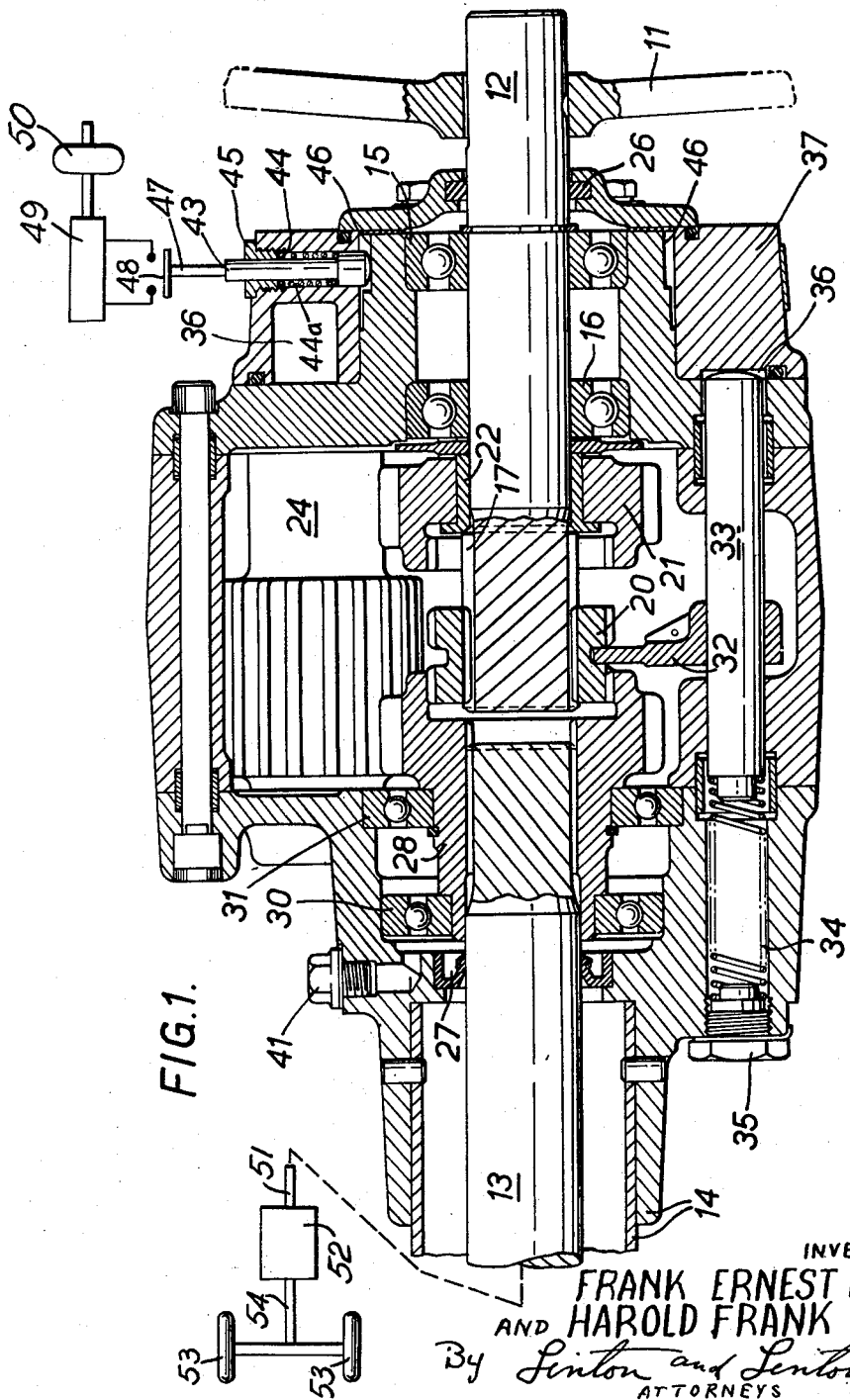
FIGURE 1 is a vertical longitudinal sectional view of the steering gear assembly.

Referring mainly to FIGURE 1, a vehicle steering shaft assembly comprises a steering hand wheel 11 attached to an input driving steering shaft 12. Through a gear train, the input steering shaft 12 is connected to an output inner steering shaft 13, in a casing 14, and hence by a connection 51 to a steering box 52 and steering road wheels 53 by a connection 54.

Figure 3:
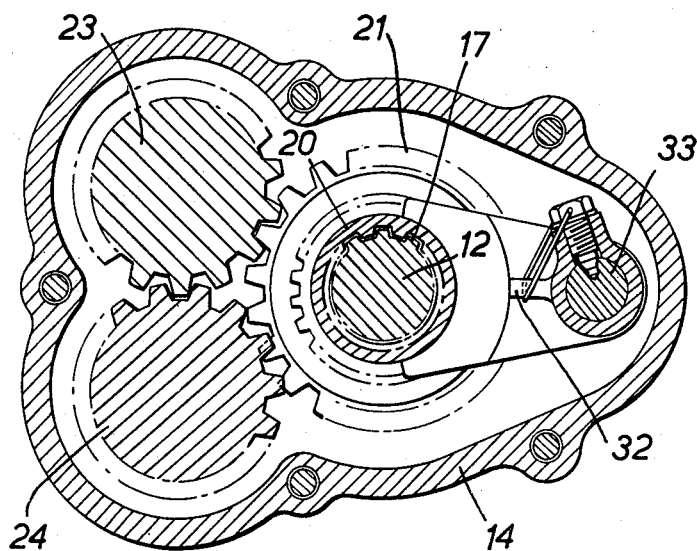
FIGURE 3 is a transverse cross sectional view taken through the pinion.
Figure 4:
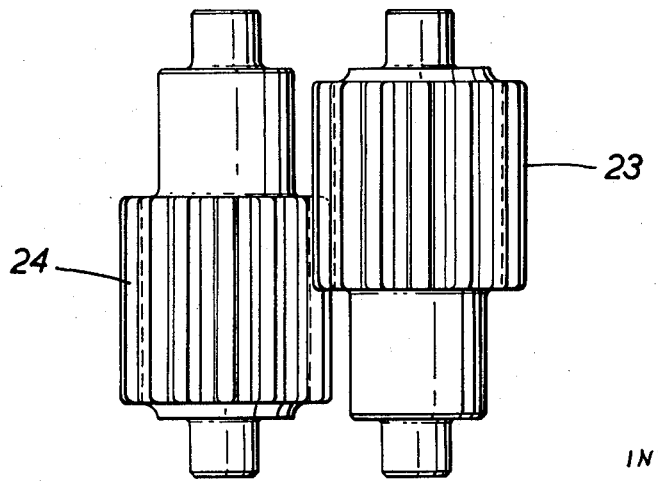
FIGURE 4 is a detail showing the pinions.

The input steering shaft 12 is mounted in bearings 15 and 16, beyond an oil seal 26, and is splined (spline 17) at the end farthest from the steering hand wheel 11. A toothed clutch 20 slides on the splines 17. An idler gear 21 runs on a bushing 22 mounted on the input shaft 12 adjacent the splines 17. The idler gear 21 is in constant mesh with a pinion 23 along half the width of the teeth of the pinion 23, which is best illustrated in FIGURES 3 and 4. The other half of the width of the teeth of the pinion 23 is in constant mesh with half the width of the teeth of the pinion 24. The pinions 23 and 24 are interchangeable and torque which is applied to the pinion 23 in one sense affects the pinion 24 in the opposite sense thus constituting a reversing drive.

The output inner shaft 13 passes through an oil seal 27 and has a gear 28, mounted in bearings 30 and 31, fixed to the end of the output shaft 13 at its end nearest the input inner shaft 12. The gear 28 is in constant mesh with the other half of the width of the teeth of the pinion 24 from that which is in constant mesh with the pinion 23.

The clutch 20 has two selective operative positions: the first in engagement with the gear 28 for direct steering, and the second in engagement with the idler gear 21 for reverse steering. The position of the clutch 20 is controlled by a fork 32 which is fixed to a selector shaft 33. The selector shaft 33 is loaded by a spring 34 resting on a stop 35, and is kept in a groove 36 in a reversing boss 37 which is mounted on an extended part of the casing 14.

Figure 2:
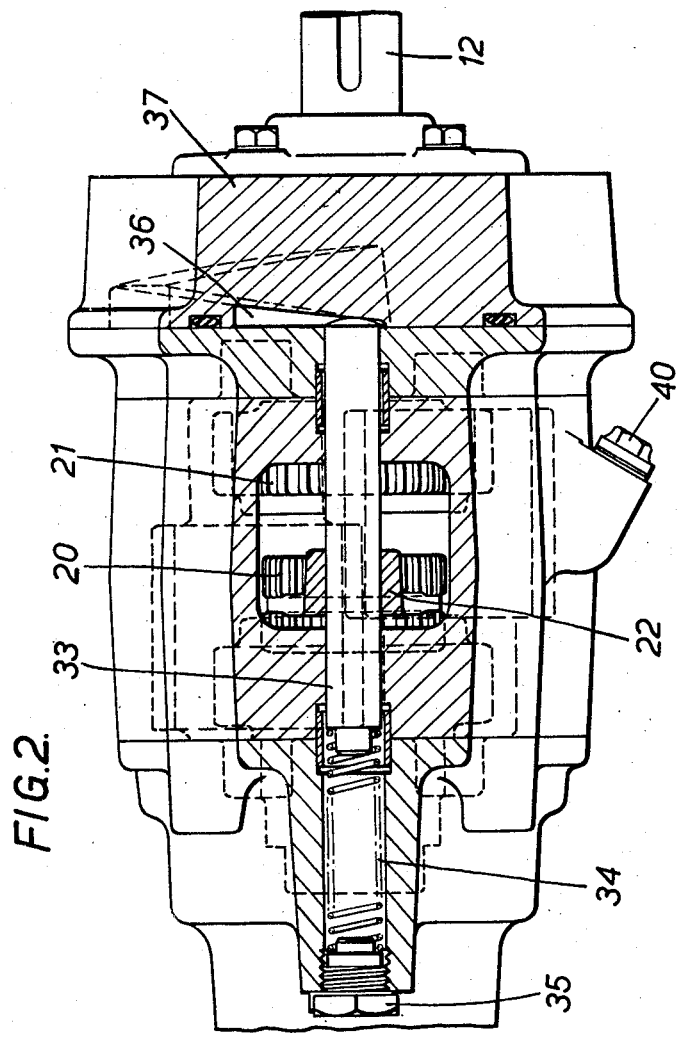
FIGURE 2 is a horizontal longitudinal sectional view of the steering gear assembly taken perpendicular to the plane of FIGURE 1.
Figure 5:
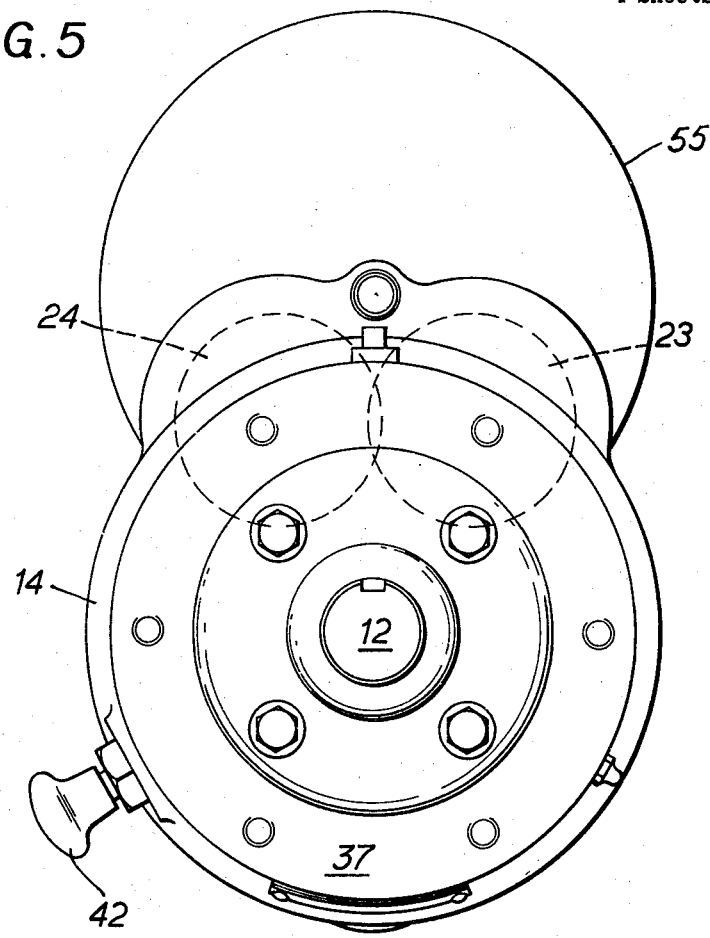
FIGURE 5 is a transverse cross sectional view taken through the input steering shaft outside the casing.
Figure 6:
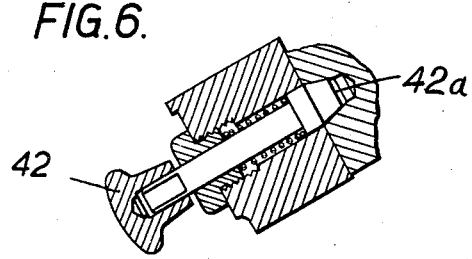
FIGURE 6 is a detail showing the plunger for locking the reversing boss in position.

The reversing boss 37, best illustrated in FIGURE 5, is rotatable through 180° with respect to the casing 14 between two positions in which it is selectively fixable by a locking plunger 42 (FIGURE 6) by its end 42a engageable in recesses in the boss. The groove 36, which is of variable depth, comprises a semi-circular ramp so inclined that in one of the positions in which the reversing boss 37 is fixable, the spring 34 is compressed and the fork 32 holds the clutch 20 in engagement with the gear 28 (as shown in FIGURES 1 and 2) while in the other position in which the boss 37 is fixable, the spring 34 is extended and the fork 32 holds the clutch 20 in engagement with the idler gear 21.

The casing 14 and its contents are lubricated so that in use the casing 14 is filled with oil up to about the level of the clutch 20. In FIG. 2, item 40 is an oil inlet and 41 an oil drain.

To the reversing boss 37 is fixed a vehicle instrument panel 55, but which, in practice, is of much larger surface area than the casing 14 and almost as big as the hand steering wheel 11. The embodiment of the invention illustrated in the drawings has been used in a heavy duty tractor which, when working as in loading, is steered by the rear pair of road wheels. This is not always acceptable on the open road, so for road use the driver moves into a seat facing the same steering pair of road wheels, pulls out the locking plunger knob 42, and rotates the instrument panel 55 (which is fixed to the boss 37) through 180° so that the instruments on the panel are the right way up with respect to his new seat. By thus rotating the boss 37 around shaft 12 the driver will have reversed the sense of the steering, that is to say, when driving with the steering road wheels forward, a pull with the right hand on the steering hand wheel will still continue to make the vehicle turn to the right, and a pull with the left hand will make it turn to the left just as it did when the driver was in his old seat and the vehicle was moving in the opposite direction. In the former position, with the steering pair of road wheels at the rear, a movement in the opposite sense of the same steering pair of road wheels was needed to give the same effect.

During the rotating of the instrument panel and the boss 37, there is a time when these members are displaced through about 90° when the driving hand steering wheel 11 and the input shaft 12 are disengaged from the output inner shaft 13 and, hence, from the steering pair of road wheels. Under these conditions the vehicle is out of control and so, as a safety measure, there is provided in the reversing boss 37, a plunger 43 (FIG. 1) sliding in a radial bore 44a which by rod 47 operates a switch 48 in the circuit of a solenoid 49 which serves by valve 50 to cut off fuel from the engine when boss 37 is substantially in such 90° position midway between its terminal positions and hence to stop the engine.

The plunger 43 is loaded with a spring 44 resting on a stop 45, and is thus kept in contact with that portion of the casing 14 on which the boss 37 is mounted. That portion of the casing 14 has two short arc flats 46 in which the plunger 43 rests for certain angular positions when the boss 37 is within 5° of either of the two positions in which it is fixable. Thus, whenever the boss 37 is more than 5° from either of these two positions, so that the steering hand wheel 11 may soon be disengaged from the driving steering pair of road wheels, the plunger 43 makes its solenoid shut the engine off.

We claim:

1. In a reversible steering control for a road vehicle having a pair of steering wheels rotatably mounted at one end of the vehicle and further having a steering box connected to said pair of steering wheels for moving the same and further having motor drive means for driving said vehicle, said steering control comprising an output steering shaft adapted to be operatively connected to said steering box, an output gear fixedly mounted on said output steering shaft, an input shaft coaxial with said output shaft, a clutch splined to one end of said input shaft on which it is slidably mounted, an idler gear idly mounted on said input shaft, said clutch being so mounted that in a first position thereof on said input shaft it will engage said output gear, and in a second position thereof it will engage said idler gear, a gear train mounted operatively between said idler gear and said output gear, and arranged so that when said clutch is in its second position it will drive said output gear in the direction opposite to the direction in which it is driven when said clutch is in its first position, setting means for selectively setting said clutch in either one of its said two positions, a housing wherein said shafts and gears and clutch are mounted, a boss mounted rotatably around said input shaft between two terminal positions thereof, said boss comprising means engageable with said setting means for selectively displacing said setting means and said clutch into one of its said two positions, and a displaceable instrument panel fixedly attached to said boss and rotatable therewith, whereby the direction in which said output shaft is driven is determined by the position of said boss and said instrument panel.

2. A steering control according to claim 1, said setting means comprising a spring-loaded linearly displaceable selector rod having a terminal engaging portion, said boss having a ramp circular groove of variable depth in which the terminal engaging portion of said selector rod engages, whereby the position of said ramp in said groove determines the position of said clutch.

3. A steering control according to claim 1, and disabling means adapted to be connected to said motor drive means and arranged when activated to disable said motor drive means, said boss comprising activating means activatable when said boss is midway between its two terminal positions to activate said disabling means.

References Cited in the file of this patent

UNITED STATES PATENTS

| | | |
|---|---|---|
| 1,219,537 | Dalton | Mar. 20, 1917 |
| 1,909,330 | Banker | May 16, 1933 |
| 2,507,733 | Mott | May 16, 1950 |
| 2,638,014 | Railton | May 12, 1953 |
| 2,780,421 | Herr | Feb. 5, 1957 |
| 3,031,024 | Ulinski | Apr. 24, 1962 |
| 3,103,985 | Price | Sept. 17, 1963 |